UNITED STATES PATENT OFFICE.

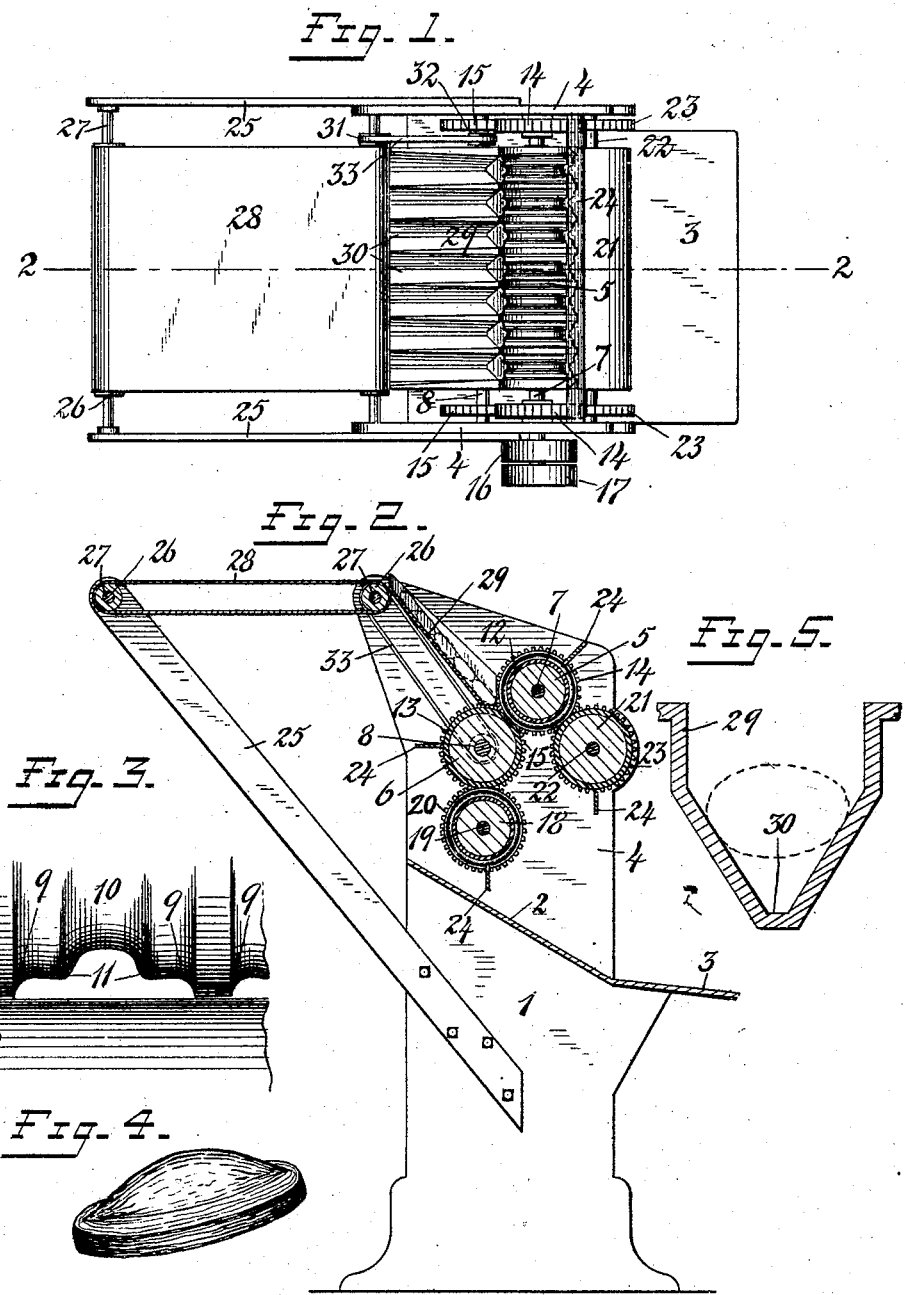

ALBERT CROMWELL BURDICK, OF PORTLAND, OREGON.

MACHINE FOR SHAPING PRUNES.

No. 842,075.　　　Specification of Letters Patent.　　　Patented Jan. 22, 1907.

Application filed August 28, 1906. Serial No. 332,343.

*To all whom it may concern:*

Be it known that I, ALBERT CROMWELL BURDICK, a citizen of the United States, and a resident of Portland, in the county of Multnomah and State of Oregon, have invented a new and Improved Machine for Shaping Prunes, of which the following is a full, clear, and exact description.

This invention relates to a new and useful machine for shaping prunes, it being especially designed to roll dry or evaporated prunes into a novel shape, as best adapted for the top layer when packing them in boxes and commonly known as "facing" prunes. The machine is capable of acting on a large number of prunes simultaneously, thereby shaping them with facility and at a nominal cost.

One embodiment of the invention consists of two coacting rolls, one of which is formed with a smooth surface, whereas the other is provided with a series of annular grooves passing about its periphery of a shape corresponding to that given the prune. The prunes are fed to these rolls by an endless belt or apron coöperating with a chute composed of a series of V-shaped guides, each guide leading to and registering with a groove in the grooved roll. Suitable detaching means prevent the prunes from adhering to the rolls after passing through them and precipitating the prunes on an inclined chute or shelf in a condition ready to be packed.

Reference is to be had to the accompanying drawings, forming a part of this specification, in which similar characters of reference indicate corresponding parts in all the figures.

Figure 1 is a plan view of my improved machine complete. Fig. 2 is a vertical central sectional view on the line 2 2 of Fig. 1. Fig. 3 is a fragmentary view of the shaping-rolls disclosing the novel form of the groove in the grooved roll which is employed. Fig. 4 is a perspective view of a prune after passing through the machine, and Fig. 5 is a transverse sectional view of one of the grooved guides for directing the prunes from the endless belt between the shaping-rolls, a prune being shown in position thereon in dotted outline.

Referring to the drawing-figures, the numeral 1 indicates the body or frame of the machine, having an inclined shelf or chute 2, leading to a table 3, and standards 4 at each side of the chute. In the standards 4 are journaled rolls 5 and 6 on axes 7 and 8, respectively, said rolls being in engagement at their peripheries and arranged at an angle of substantially forty-five degrees. The upper roll 5 is provided with a series of annular grooves passing about its periphery, which are of a shape as illustrated in Fig. 3 and consist of a wide cut-out portion of shallow depth with inner filleted corners 9 and a central groove 10 of slightly-greater depth, the groove 10 having a rounded bottom with outwardly-inclined sides joining with the shallow cut-out portion by rounded corners 11, the depth of the cut-out portion at the corners 11 being somewhat less than at the corners 9, as clearly shown. It is evident that when a prune is passed through a groove of this shape it will be formed with a flat oval base having a semi-ovoid center at one side thereof, the pit of the prune being partially contained in the semi-ovoid and the skin of the prune acting to draw it into the shape as represented in Fig. 4 when passed between the rolls. The rolls 5 and 6 are covered over with a soft material 12 and 13, respectively, preferably of rubber, which obviates danger of the skin of the prune being broken during the shaping operation, it of course being understood that the covering 12 is made to conform to the series of shaping-grooves.

Each end of the axes 7 and 8 have fixed to them intermeshing gears 14 and 15, respectively, the axis 7 being extended at one side beyond the adjacent standard 4, where it is provided with the usual fixed and loose pulleys 16 and 17 for driving the rolls. Directly underneath the roll 6 is journaled a roll 18 in the standards 4 on an axis 19, which carries at each end a gear 20, meshing with the gears 15, from which the roll is driven. This roll 18 is of the same construction as the roll 5, having the series of grooves and rubber covering, as shown in Fig. 2.

A roll 21, identical in construction to the roll 6, is journaled on an axis 22 in the standards 4 and has fixed to each side a pinion 23, meshing with the pinions 14 at each side of the roll 5, the peripheries of the rolls 5 and 21 being in contact. A plurality of scraper-plates or detachers 24 extend between the standards 4, with which they are connected, and are each in substantial contact with the peripheries of one of the rolls, the scrapers 24, in contact with the rolls 5 and 6, being arranged to remove such prunes as happen to pass the rolls 18 and 21 and the scraper-plates 24 in contact with the rolls 18 and 21 being arranged underneath them. From this arrangement it is seen that prunes on passing through the rolls 5 and 6 receive their shape, and should they continue to adhere to the peripheries of either of said rolls they will either be removed to the peripheries of the rolls 18 or 21 and thereafter detached by the scraper-plates 24 coacting with them or be removed by the scraper-plates 24, coacting with the rolls 5 and 6.

An arm 25 is secured to each side of the machine-frame and projects upwardly in an angular direction thereover to about the height of the standards 4. Between these arms and between the standards are journaled rolls 26 on suitable axes 27, over which passes a belt or apron 28, acting when in operation to carry the prunes to an inclined chute 29, corrugated to form a series of guide-grooves 30, decreasing in width from their upper to their lower ends, each groove registering at its lower end with a groove in the roll 5. A pulley 31 is fixed to one end of the axis 27, journaled in the standards 4, and a corresponding pulley 32 is fixed in alinement therewith to the axis 8, said pulleys being connected by a belt 33.

When the machine is set in motion, the several rolls revolve at substantially the same speed in view of their intermediate gearing, and the apron 28 moves in the direction of the chute 29, discharging any prunes placed thereon into the several guide-grooves of the chute, which conducts them between the rolls, the latter discharging them in a condition as hereinbefore indicated.

Although I have described the invention in detail in order that the construction and operation might be fully understood, it is evident that the precise embodiment is not material, provided its essential characteristics are employed as pointed out in the annexed claims.

Having thus described my invention, I claim as new and desire to secure by Letters Patent—

1. The combination of two coacting rolls for shaping prunes, one of which is provided with a series of annular grooves in its periphery, means for detaching the prunes after passing between the rolls from the periphery thereof, comprising a roll in contact with, and driven from each of said first-named rolls, and a scraper for each of the rolls.

2. The combination of two coacting rolls for shaping prunes, one of which is provided with a series of annular grooves in its periphery, a roll intergeared with and positively driven by each of said rolls, and a scraping-plate contacting with the periphery of each roll.

3. The combination of two coacting rolls for shaping prunes, one of which is provided with an annular groove in its periphery, a roll positively driven from and contacting with the periphery of each of said coacting rolls, and scraping means for said driven rolls.

In testimony whereof I have signed my name to this specification in the presence of two subscribing witnesses.

ALBERT CROMWELL BURDICK.

Witnesses:
B. E. YOUMANS,
M. A. BRADY.